United States Patent [19]
Shagam

[11] Patent Number: 6,161,216
[45] Date of Patent: Dec. 12, 2000

[54] SOURCE CODE DEBUGGING TOOL

[75] Inventor: Eli Shagam, Brookline, Mass.

[73] Assignee: EMC Corporation, Hopkinton, Mass.

[21] Appl. No.: 09/069,608

[22] Filed: Apr. 29, 1998

[51] Int. Cl.[7] .................................................. G06F 9/44
[52] U.S. Cl. ............................................................. 717/4
[58] Field of Search ..................................................... 717/4

[56] References Cited

U.S. PATENT DOCUMENTS

| | | | |
|---|---|---|---|
| 5,450,586 | 9/1995 | Kuzara et al. | 717/4 |
| 5,533,192 | 7/1996 | Hawley et al. | 395/183.04 |
| 5,590,330 | 12/1996 | Coskun et al. | 717/4 |
| 5,724,505 | 3/1998 | Argade et al. | 714/45 |
| 5,732,272 | 3/1998 | Gochee | 717/4 |
| 5,737,608 | 4/1998 | Van De Vanter | 717/1 |
| 5,793,947 | 8/1998 | Sakamoto | 395/183.21 |
| 5,815,714 | 9/1998 | Shridhar et al. | 717/4 |
| 5,845,125 | 12/1998 | Nishimura et al. | 717/4 |
| 5,903,718 | 5/1999 | Marik | 395/183.14 |
| 5,915,114 | 6/1999 | McKee et al. | 717/4 |
| 5,923,878 | 7/1999 | Marsland | 717/4 |
| 5,946,486 | 8/1999 | Pekowski | 717/4 |
| 5,946,488 | 8/1999 | Tanguay et al. | 717/5 |
| 5,983,366 | 11/1999 | King | 714/38 |
| 5,991,899 | 11/1999 | Deacon | 714/37 |
| 6,026,503 | 2/2000 | Gutgold et al. | 714/45 |

OTHER PUBLICATIONS

Ezust et al., An Automatic Trace Analysis Tool Generator for Estelle Specifications, 1995, ACM, p. 175–184.

Siemens et al., Run–Time Requirements Tracing, 1993, IEEE, p. 350–355.

*Primary Examiner*—Tariq R. Hafiz
*Assistant Examiner*—John Q. Chavis
*Attorney, Agent, or Firm*—Fish & Richardson P.C.

[57] ABSTRACT

A method and apparatus for debugging the source code using the source code debugger includes the following steps. A script generator is provided to receive source code instructions. Executing the script generator includes reading each source code instruction and generating, based on the type of instruction, a debugging script. The debugging script includes a specification of trace points. The debugging script is then provided to the source code debugger.

18 Claims, 8 Drawing Sheets

```
$Id: prepare_trace.pl,v 1.10

DESCRIPTION: 1. analizes a c routine.
                prepares a break-points (line number) at the end
                of each block of flow control with a list of
                variables: referenced or modified.

SYNTAX: prepare_trace.pl [modifiers] <file> <routine>
        modifiers:
        [-d]     debug
        [-v]     verbose
        [-args]  explicit arguments (default: collect $args)
        [-locals] explicit locals (default: collect $locals)
        [-step]  while-stepping loop (default: collect $locals)
        [-pass]  passcount=1 at end of routine
        [-all]   collect $locals after every assignment statement EXAMPLE: prepare_trace.pl mservice.c mem_serv_get_addr
       : prepare_trace.pl mservice.c mem_serv_display
       : prepare_trace.pl -b gdb_c_test.c gdb_c_test
       : prepare_trace.pl    gdb_c_test.c > gdb_c_test.dbg
       : rm aaa; prepare_trace.pl -v -pass disasm_util.c
disassemble_util > aaa; vi aaa
       : rm aaa; prepare_trace.pl -v -pass disasm_util.c
ppc_dis_assmble_txt > aaa; vi aaa
       : rm aaa; prepare_trace.dbg gdb_c_test.c > aaa
```

FIG. 4A

```
local_patt_search >  local_patt_search.d        > prepare_trace.pl -v -pass -step evnttrac.c  }38

# 972.           *pp_local_trace -= size*8;
# 973.           *pp_local_trace %= RING_BUFFER_LENGTH;
# 974.         }
# 975.
# 976.   /*------------------------------------------------
# 977.    *
# 978.    * FUNCTION NAME: local_patt_search
# 979.    *
# 980.    * DESCRIPTION:
# 981.    *     Search event_trace from nvd memory.
# 982.    *     Utility: 90,frame_num,aa0031,patt.b
# 983.    *     Utility: 90,frame_num,aa0032,patt.w
# 984.    *     Utility: 90,frame_num,aa0034,patt.l
# 985.    *
# 986.    * USED GLOBAL VARIABLES:
# 987.    *
# 988.    * AFFECTED GLOBAL VARIABLES:
# 989.    *
# 990.    * RETURNED VALUE: Offset in local_event_trace.
# 991.    *
# 992.    * NOTES: None.
# 993.    *
# 994.    *------------------------------------------------*/
# 995.
# 996.   ULONG local_patt_search (ULONG * p_inl_params, ULONG *
         pp_local_trace, ULONG * p_n_frame)
997.   {                                                              }42 trace evnttrac.c:local_patt_search
    passcount 0
    actions
      collect $args                                                     }45
  end
```

41 — trace evnttrac.c:local_patt_search
 43 — passcount 0 / actions
 47 — end
 40 — (brace)

FIG. 4B

```
# 978.        ULONG    screen_lines = 0;
# 999.        ULONG    found = 0;
# 1000.       ULONG    size_8;
# 1001.       UCHAR    local_frame[FRAME_MAX];
# 1002.       ULONG    status;
# 1003.       T_EVNT_REC *p_local_frame;
# 1004.
# 1005.       /* Round up address of frame. */
# 1006.       p_local_frame = (T_EVNT_REC *) (((ULONG)&local_frame + 7) &
0xfffffff8);
# 1007.
# 1008.       while ((screen_lines < 18)
                   && (*p_n_frame < NUM_OF_LOCAL_EV_TRC_FRAMES))
# 1009.       {
# 1010.

#for/while statement, line:1008
trace evnttrac.c:1008
    passcount 0
    actions
    while-stepping 10
    end
```

```
# 1011.     size_8 = get_event_from_nvd (p_local_frame, (ULONG)
ring_buffer_trace + *pp_local_trace);
                                                               ⎫
#call_routine statement - level:2, line:1011                   ⎪
trace evnttrac.c:1011                                          ⎬ 46
passcount 0                                                    ⎪
   actions                                                     ⎪
      collect $local                                           ⎪
   end                                                         ⎭

# 1012.
# 1013.          if ((p_local_frame->ev_frmt != 0) && (p_local_frame->ev_frmt
!= FRMTEX)
#1014.              && chk_for_legal_start_rec_format (p_local_frame))
# 1015.        {
                                                               ⎫
#if statement, line:1013                                       ⎪
trace evnttrac.c:1013                                          ⎬ 48
passcount 0                                                    ⎪
   actions                                                     ⎪
      while-stepping 10                                        ⎪
      end                                                      ⎪
   end                                                         ⎭

⎫
#start of block  - level:3, line:1015                          ⎪
trace evnttrac.c:1015                                          ⎬ 50
passcount 0                                                    ⎪
   actions                                                     ⎪
      collect $local                                           ⎪
   end                                                         ⎭
```

FIG. 4D

```
1028.           } end of block   - level:3, line:1028  ⎫
trace evnttrac.c:1028                 ⎬ 52
                                      ⎭

.

.

.

# 1047.
# 1048.    return found;

#return statement, line:1048  ⎫
trace evnttrac.c:1048         ⎪
 passcount 1                  ⎬ 54
   actions                    ⎪
       collect $local         ⎪
   end                        ⎭
```

FIG. 4E

SOURCE CODE DEBUGGING TOOL

BACKGROUND OF THE INVENTION

The invention relates generally to source code debugging.

As computer programs become increasingly complex, a newly written program, will more likely than not, contain errors or "bugs" that prevent the program from operating in its intended manner. "Debugging" is the process of locating and correcting the errors in the program.

One approach for debugging software utilizes an in-circuit emulator (ICE), a hardware device which allows information to be collected in real-time while the program is being executed. One type of ICE, for example, includes a socket-like device which is attached between the package of the microprocessor (or microcomputer) and the mother board to which the microprocessor is normally attached. The ICE allows the source code and values of variables to be viewed as the source code is being executed.

Software debugging approaches generally require manually inserting break or trace points at predetermined points within the source code. Execution of the source code program is halted whenever a break point is encountered to allow the programmer to observe certain variables and the behavior of the program at the breakpoint.

SUMMARY OF THE INVENTION

The invention provides a software tool, a script generator which, when used with a source code debugger, provides a faster and more efficient approach for debugging source code. The script generator creates a debugging script relatively quickly, even though a large number (e.g., 200) of trace points or break points are required within the source code. Thus, the script generator effectively improves the performance and provides added value to the source code debugger.

In a general aspect of the invention, a method of debugging the source code using the source code debugger includes the following steps. A script generator is provided to receive source code instructions. The script generator implements the steps of reading each source code instruction and generating, based on the type of instruction, a debugging script. The debugging script includes a specification of trace points. The debugging script is then provided to the source code debugger.

Embodiments of the invention may include one or more of the following features. Each trace point: has a line identifier and may optionally include a function argument or a variable to be collected by the source code debugger. The method further includes compiling the source code and executing the source code in conjunction with the source code debugger. Thus, the approach described above allows the programmer to define, in advance, the criteria for placement of trace points, as well as the function arguments and variables desired to be collected before the debugging procedure is started. The approach also decreases the likelihood that a relevant trace point is placed at the wrong position or is not placed at all. This can be particularly troublesome in situations where a trace point is triggered after a very long time and having to re-execute the debugging procedure will waste valuable time.

Each trace point location in the specification includes a pass-count for determining the number of times the trace point location is executed before terminating execution of a process associated with the source code. Providing a pass-count has numerous advantages including allowing execution of the program to continue while collecting important information for trace points. This feature is particularly important in applications where the host computer is interacting with other systems (e.g., disk storage systems). Stopping execution of the program may cause the other systems connected to the host computer to "time-out" and be placed in error-recovery mode, thereby changing the behavior of the source code that is being debugged.

The step of identifying the trace point locations is based on identifying control-flow boundaries, such as the start or end of an execution block. An execution block is defined here as meaning a series of instructions, all of which will be executed if the first of the series is executed. The step of generating the debugging script includes collecting at least one variable or function argument at the beginning or end of the execution block. For example, variable or function arguments that are changed during execution of the block are collected.

The control-flow boundary can be an event requiring a trace point to be placed in any of the following circumstances:

a) prior to calling a function;
b) upon returning from a function;
c) upon entering a function;
d) upon exiting a function;
e) at a conditional statement;
f) at the first iteration of a loop;
g) at the completion of a loop; and
h) at an implicit block.

In certain applications, the debugging script can be modified by providing additional trace points, deleting trace points specified by the script generator, or modifying the variable or function arguments collected at a trace point.

In another aspect of the invention, a method for determining whether each source code instruction within a source code program has been executed includes the following steps. A script generator reads each source code instruction and identifies blocks of execution within the source code. A debugging script including a specification of trace points is then generated with each trace point placed at the beginning of each block of execution. The debugging script is then provided to the source code debugger.

With this approach, the script generator serves as a test coverage tool for verifying to the programmer that each instruction in the source code is one that will be executed. During the development of a source code program, it is not uncommon for lines of instruction to be included which, in fact, are never executed. The script generator can be used to identify such lines of instruction and blocks of execution so that they can be eliminated, thereby saving valuable storage space and increasing the efficiency of the program.

In yet another aspect, the invention is a computer-readable medium storing a computer program which is executable on a computer including a memory. The computer program is used with a source code debugger for debugging source code having instructions. The stored program includes:

a) computer-readable instructions which read each source code instruction;
b) computer-readable instructions which automatically generate, based on the type of instruction, a debugging script including a specification of trace points; and
c) computer-readable instructions which provide the debugging script to the source code debugger.

A computer-readable medium includes any of a wide variety of memory media such as RAM or ROM, as well as, external computer-readable media, for example, a computer disk or CD ROM. A computer program can also be downloaded into a computer's temporary active storage (e.g., RAM, output buffers) over a network. For example, the above-described computer program can be downloaded from a Web site over the Internet into a computer's memory. Thus, the computer-readable medium of the invention is intended to include the computer's memory which stores the above-described computer program that is downloaded from a network.

Other features and advantages of the invention will be apparent from the following detailed description and from the claims.

DETAILED DESCRIPTION

Figure 1:
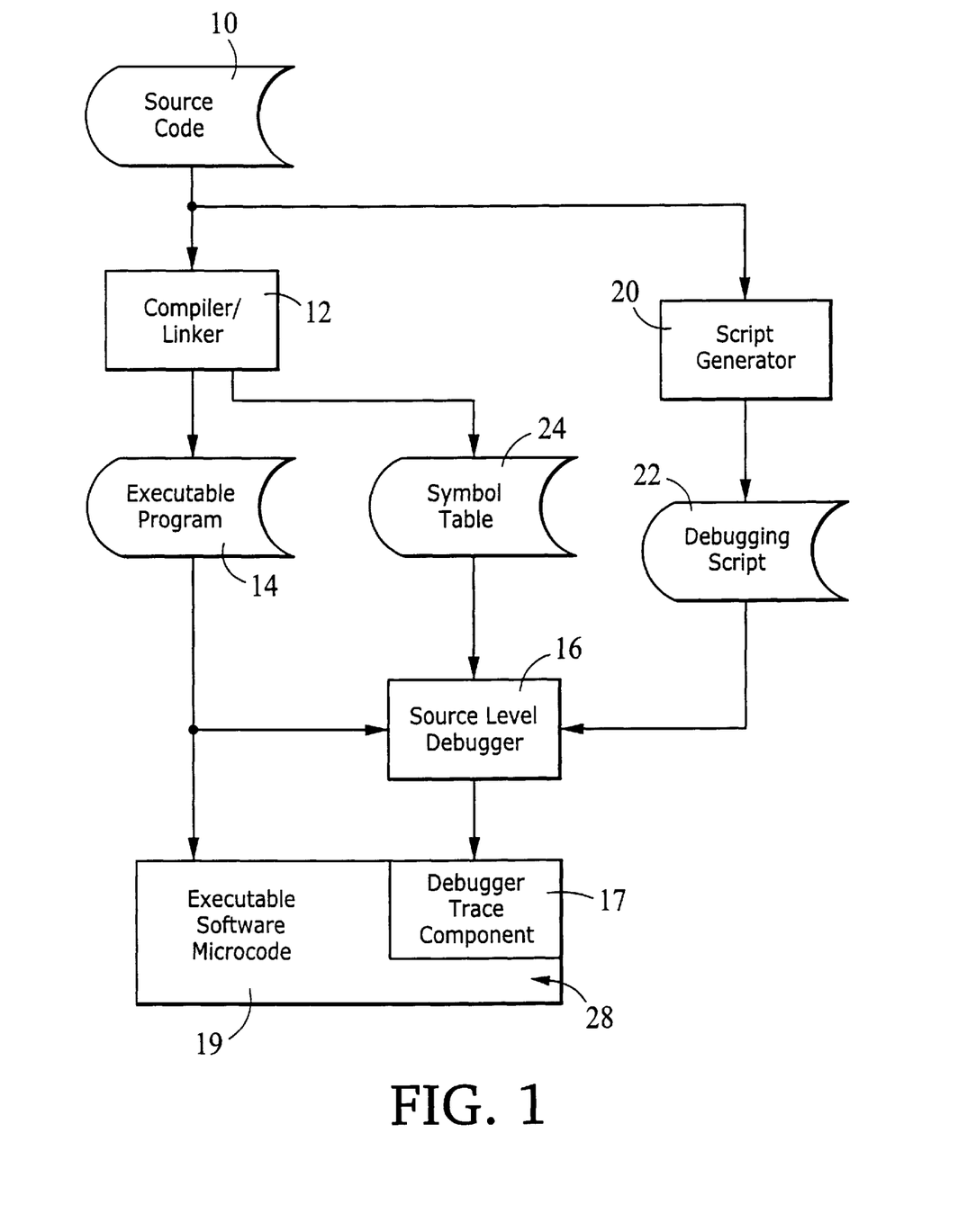
FIG. 1 is a block diagram illustrating the relationship between the script generator of the invention and a source code level debugger.

Referring to FIG. 1, source code 10 written by a programmer is required to be compiled and linked using a compiler/linker 12, thereby providing a compiled program 14 stored, for example, in a working storage 3 (FIG. 2) and when loaded and executed, produces desired results. Compiler/linker 12 is generally associated with the particular computer programming language (e.g., C, Fortran, Pascal) used to write source code 10, the particular host machine and operating system upon which compiler/linker is being run, as well as the target machine. However, as part of the writing and generating process, source code 10 must be debugged to find and correct any errors and defects in source code 10. To perform this task, a source code level debugger 16 is used to allow the programmer to insert trace points at preselected locations in source code 10. The trace points are executable instructions for collecting stored information (e.g., in registers) and indicate to the programmer, a flow of the source code, and whether the source code is being executed in the manner anticipated and intended by the programmer. Source code debugger 16 generates to a target machine 28, a debugger trace component 17 which is part of executable code 19.

The invention features a script generator 20 which automatically inserts the trace points within source code 10 and generates a debugging script 22 that specifies where a trace point is to be inserted and the particular information to be collected. Debugging script 22 is then provided to source level debugger 16 which, together with a symbol table 24, translates symbolic information into absolute addresses. Symbol table 24 (generated by compiler/linker 12) is used to make connections between source code 10 and the machine code that is generated by compiler/linker 12.

Figure 2:
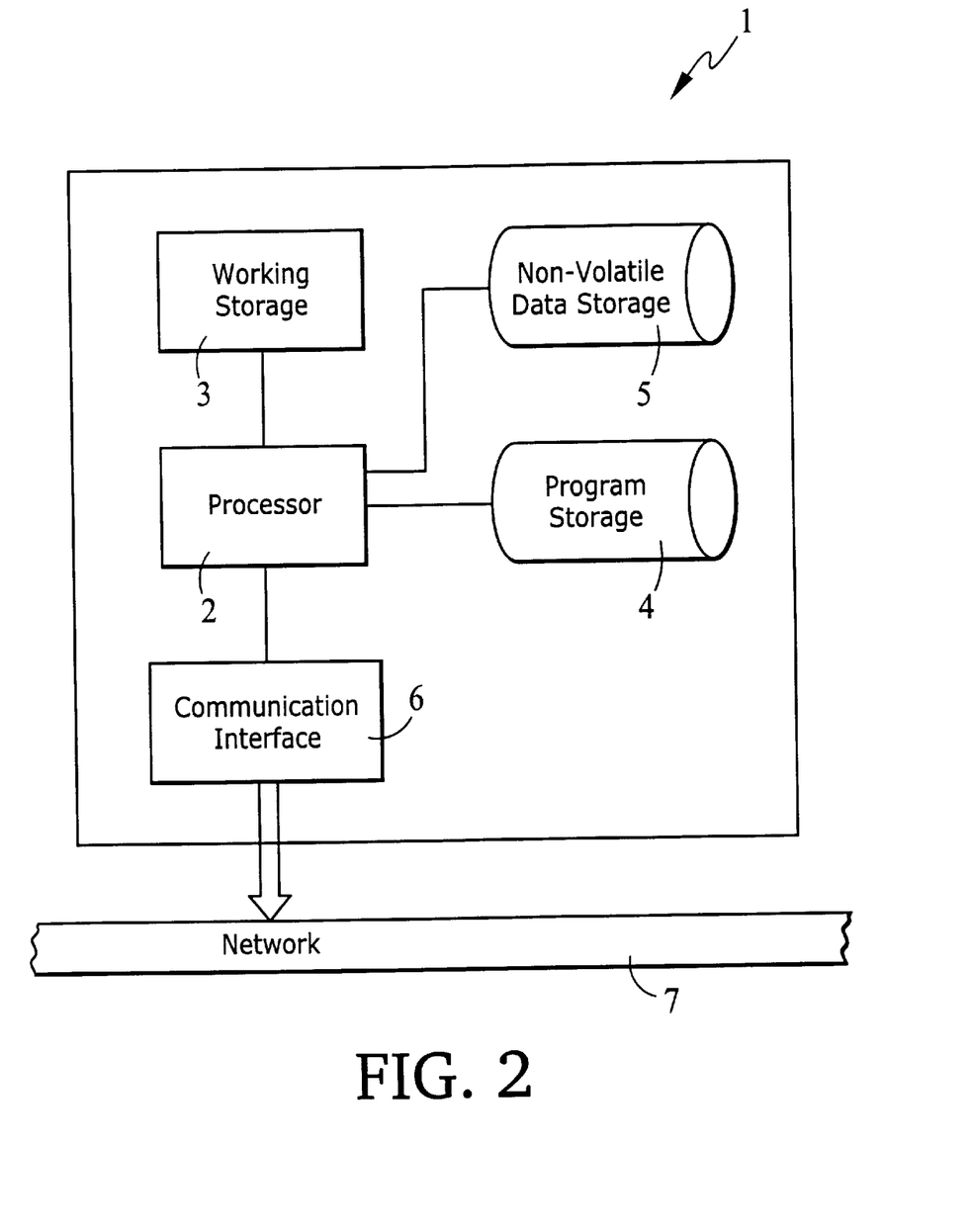
FIG. 2 is a block diagram illustrating a computer system for which the invention is particularly useful.

Referring to FIG. 2, the invention is applicable in a computer system 1 having a processor 2 a working storage 3 (e.g. RAM), a program storage 4 (e.g., fixed or removable disk), a non-volatile data storage 5 (e.g., magnetic disk), and a communications interface 6 for allowing communication to a network 7 (e.g. LAN). Source code 10, compiler/linker 12, executable program 14, source level debugger 16, script generator 20, and debugging script can be stored in any one of working storage 3, program storage 4, or non-volatile data storage 5.

As will be described in greater detail below, script generator 20 is written here with a C-like language (e.g., Perl) to read every instruction statement in source code 10 and determine whether the statement fits the criteria for inserting a trace point. If the criteria are met, script generator collects information (e.g., function arguments or variables) based on the type of instruction statement. The types of instruction statements which trigger placing a trace point may be changed by the user, based on the particular application of the source code. However, in general, trace points are placed upon arriving at the start or end of an execution block or a conditional statement. A pass-count is assigned to each type of instruction statement and is used to establish the number of times the trace point can be executed before stopping the collection of information. For example, a pass-count=0 will allow collection of information specified by the trace point to continue indefinitely. On the other hand, a pass-count set to 1, 2, . . . will stop the collection of information established by the trace point after passing through the trace point the specified number of iterations of the pass-count.

A list of typical instruction statements or control flow boundaries where trace points are placed are listed below along with their respective pass-counts (where appropriate):

1. On entry pass-count=0
2. On exit pass-count=1
3. On if pass-count=0
4. On return pass-count=1
5. On while
6. On for
7. Before a routine call
8. After a routine call
9. At a { (start of statement grouping)
10. At a } (end of statement grouping)
11. At an implicit block (i.e., an execution block of one line).

In one embodiment of the invention, the pass-count is set to 0 for all instructions except those trace points placed at the exit or return from a routine.

Referring to FIGS. 3 and 4A–4E, the operation of script generator 20 will be explained in conjunction with a flowchart 200 (FIG. 3) and portions of an exemplary debugging script 22 which has been partitioned into FIGS. 4A–4E for purposes of clarity.

Figure 4A:
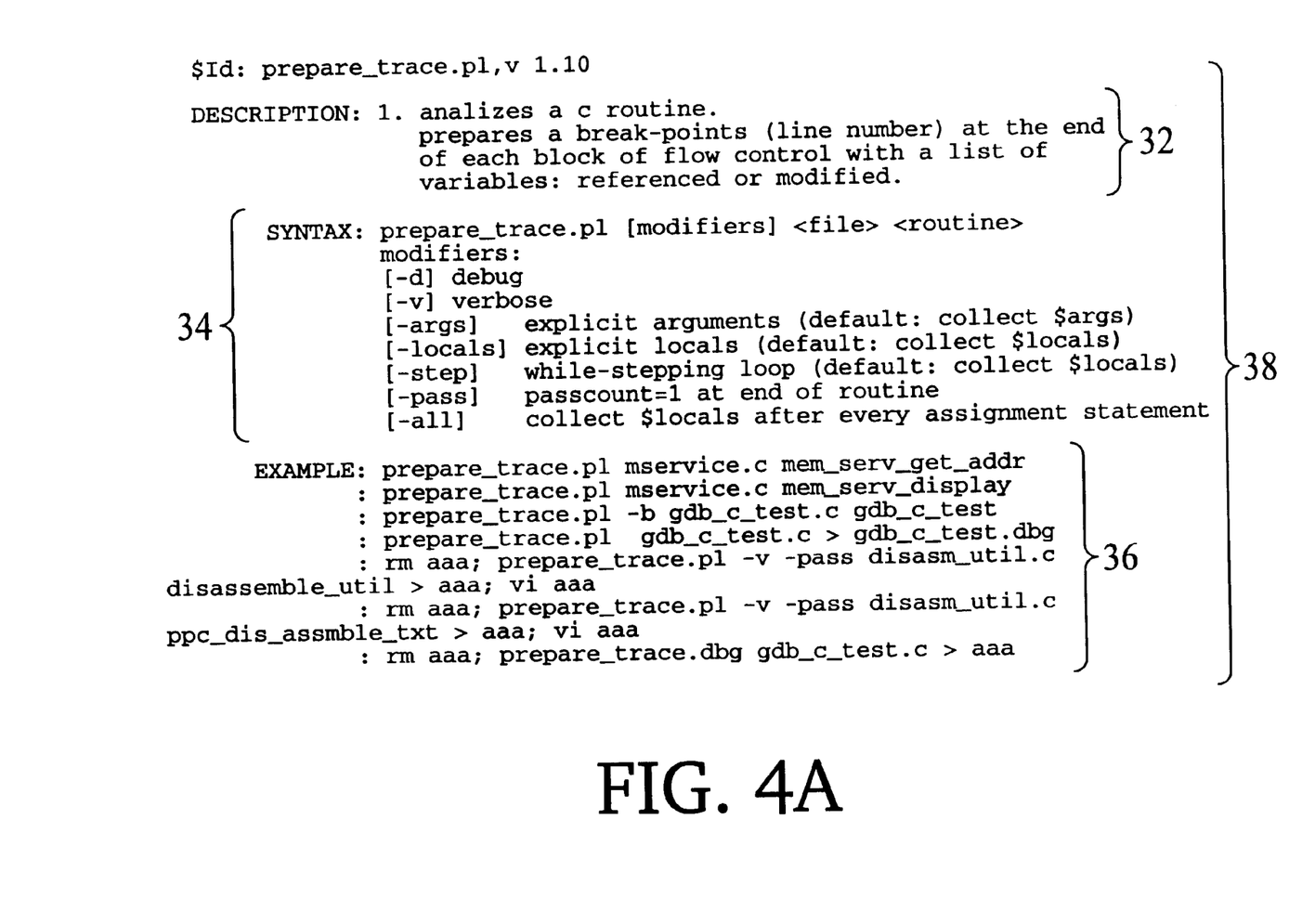
FIGS. 4A–4E are portions of a debugging script generated by the script generator of FIG. 1.

Referring to FIG. 4A, debugging script 22 is shown to include a usage section 30 which provides a general description 32 of script generator 20 and a syntax section 34. Syntax section 34 includes a list of options which can be used when script generator 20 is executed.

The "verbose" option (-v) causes script generator 20 to automatically list a number of instruction statements before and after the instruction line where a trace point is to be placed. This option provides an easy reference to the programmer for where a particular instruction statement resides relative to other instruction statements.

The "args" (-args) and "locals" (-locals) options instruct script generator to collect function arguments and local variables, respectively. "$arg" and "$locals" mean that all function arguments and local variables are collected The "all" option (-all) causes script generator 20 to automatically collect all local variables ($local) after every assignment statement. A list 36 of examples for calling script generator is also included within usage section 30.

Figure 3:
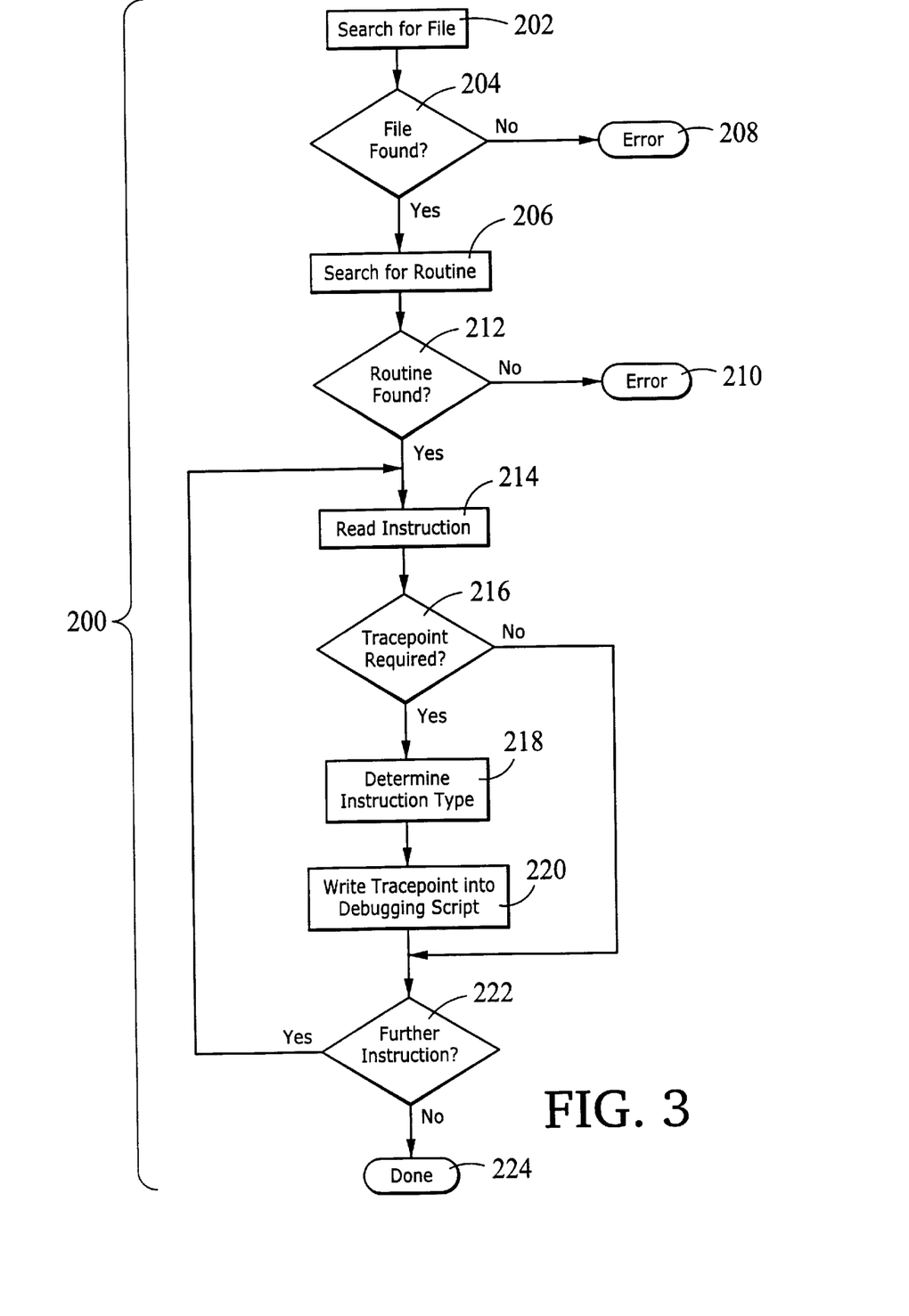
FIG. 3 is a flow diagram illustrating typical operation of the script generator.
Figure 4B:
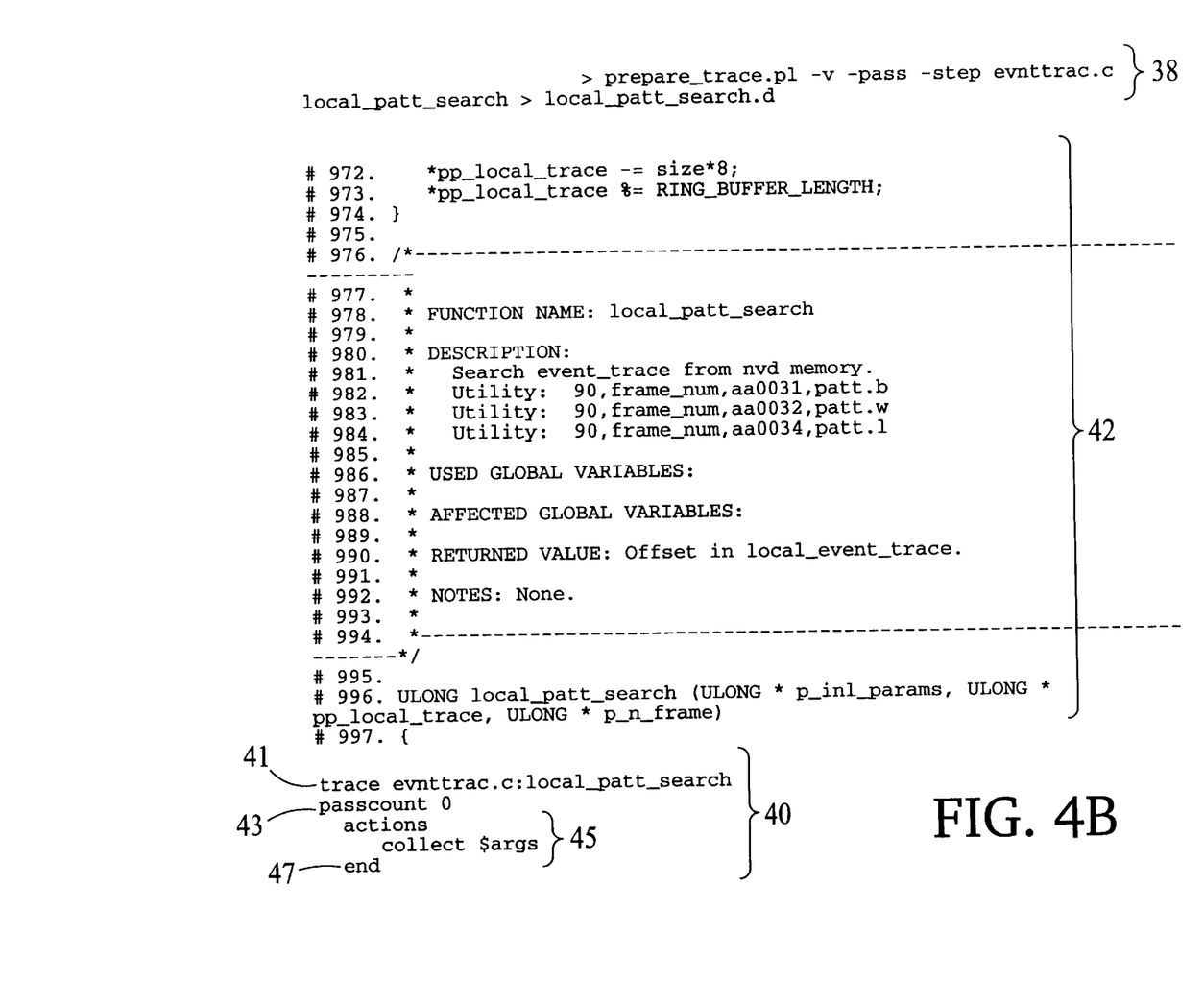

Referring to FIG. 4B, script generator 20 is called using the statement 38:

"prepare_trace.pl -v -pass -step evnttrac.c local_patt_search>local_patt₁₃ search.d Script generator 20 (here, called prepare_trace.pl of FIGS. 4A–4E) includes the verbose, pass-count and stepping options. With reference to FIG. 3, statement 38 causes script generator 20 to first search for a file called "evnttrac.c" (step 202) (see also, for example, 40 of FIG. 3B). The resulting debugging script 22 is then redirected into a file called "local_patt_search.d." If the results are not required to be stored, no filename is entered and script generator 20 will simply display the results. If the file is found (step 204), script generator 20 searches within the file for a routine (step 206) called "local_patt_search". Otherwise, an error statement is generated indicating that the file name was not found (step 208). If routine "local_patt_search" is not: found, an error statement is displayed (step 210); otherwise script generator continues operation (step 212) to read the first instruction of source code 10 (step 214) and determine whether the statement is one requiring a trace point to be inserted (step 216). If the instruction statement is one meeting the criteria set out by the programmer, the instruction type is determined (step 218) and a trace point descriptor is written into debugging script 22 (step 220). On the other hand, if the instruction statement is not one meeting the criteria, script generator 20 determines whether there are further instruction statements to be read (step 222). If there are further instruction statements, script generator 20 reads the next statement and repeats the above described process. Otherwise, operation of script generator 20 and collection of information ends (step 224).

Referring again to FIG. 4B, it can be seen that script generator 20 recognizes that instruction statement #996 is the beginning of routine "local_patt_search" and automatically places a trace point 40 at its entry. The format of trace point 40 includes a trace line 41 identifying the file name (here, evnttrac) and either the name of the routine (here, local_patt_search) or the line number where the trace point should be placed. Trace line 41 is followed by the pass-count statement 43 and action statements 45 indicating what information is to be collected. The trace point also includes an end statement 47.

Because trace point 40 is an entry to a routine, by default, all arguments ($arg) are collected and a pass-count=0 is assigned to allow script generator 20 to continue collecting information. Note also that because the verbose option was chosen, instruction statements #972 through #997 are printed in a section 42 above trace point 40 within debugging script 22 for easy reference.

Figure 4C:
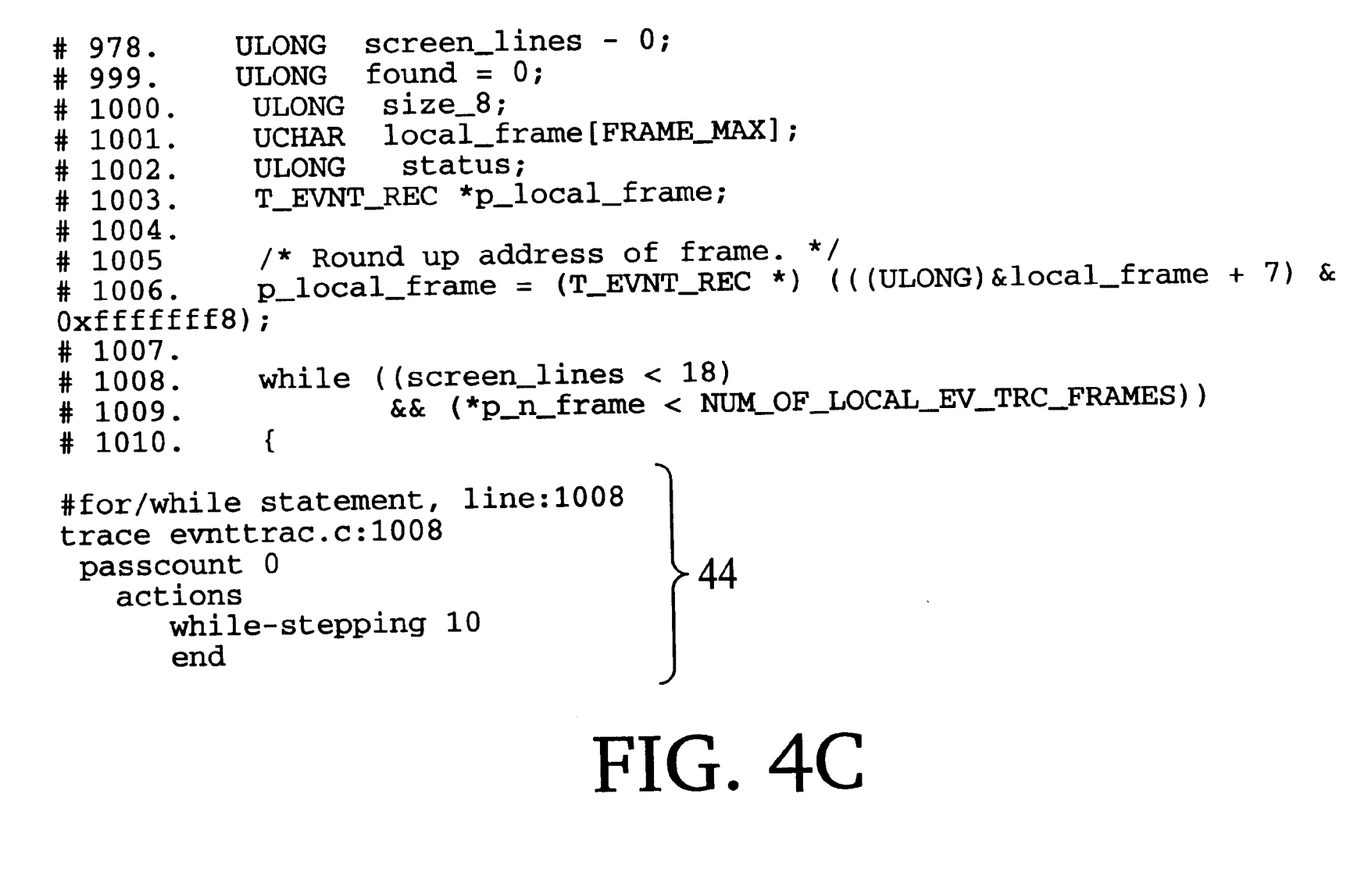
Figure 4D:
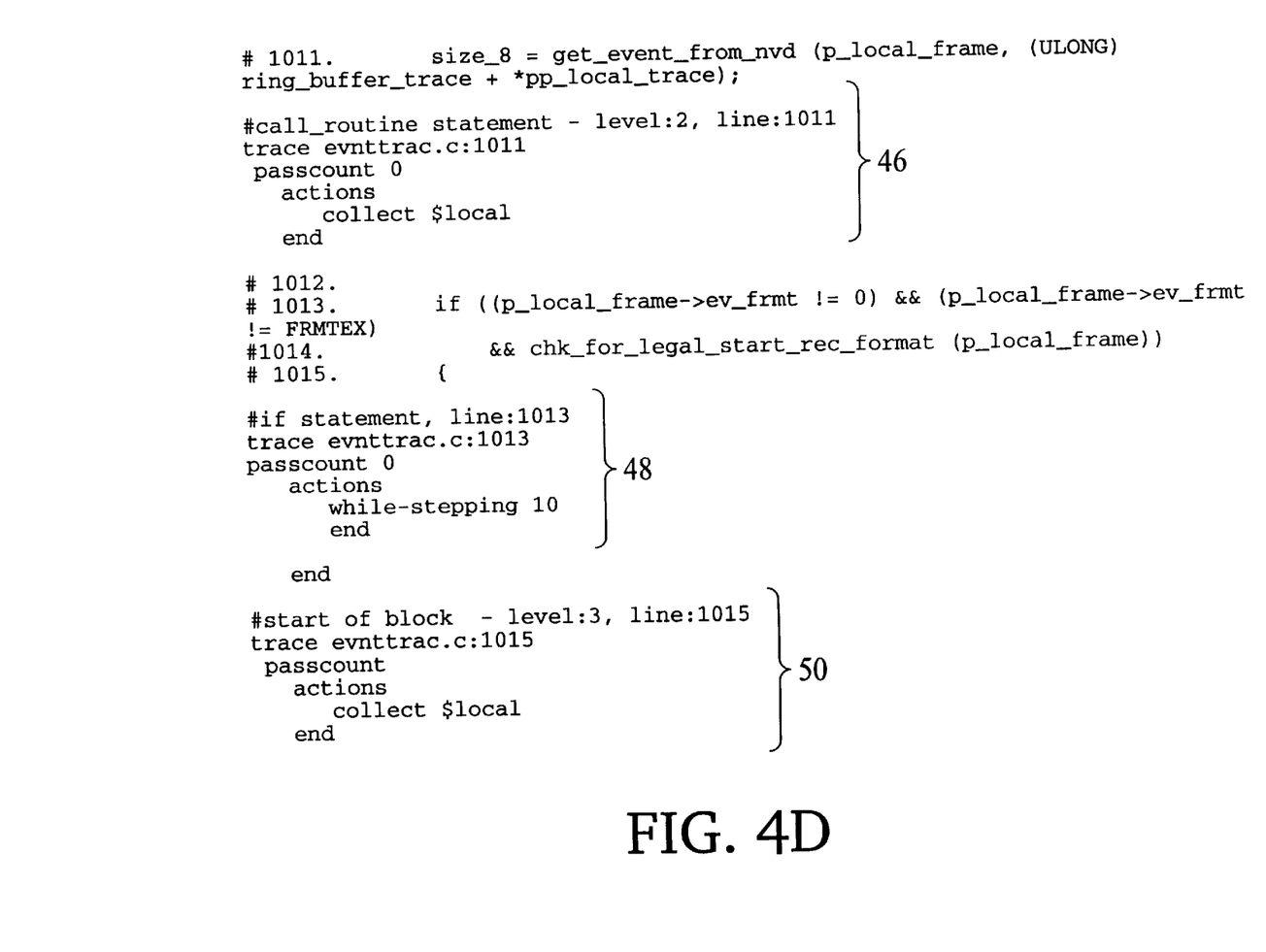
Figure 4E:
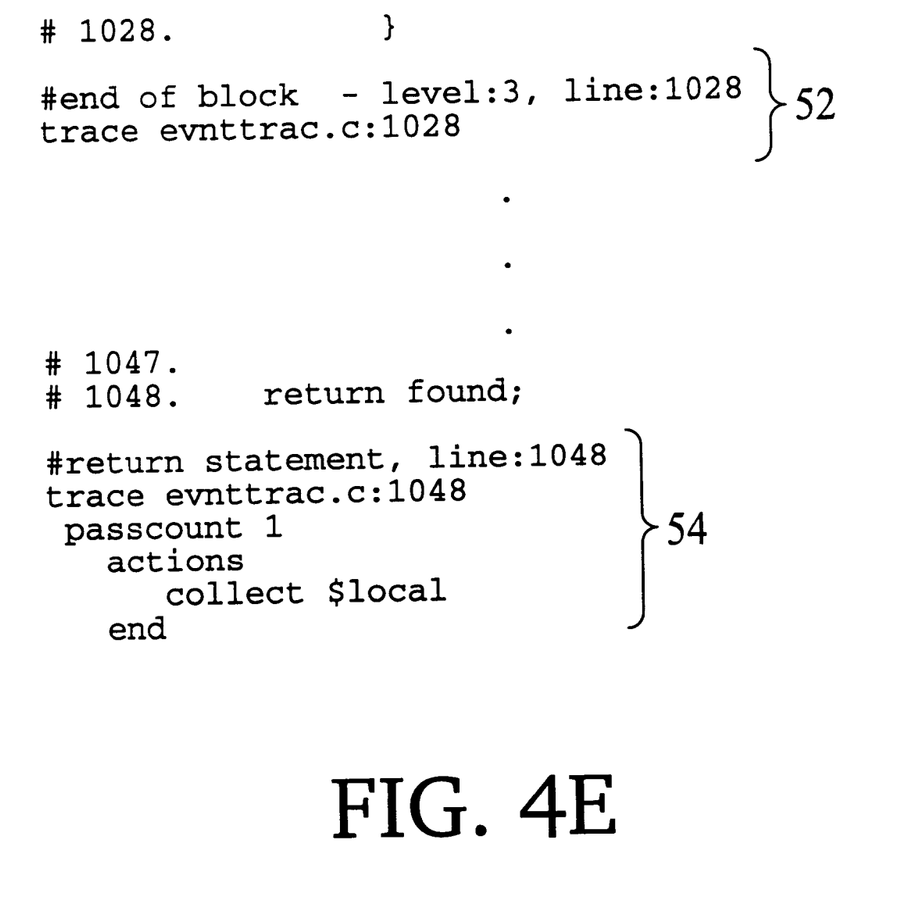

Other examples for the automatic placement of trace points are shown in FIGS. 4C–4E. FIG. 4C indicates that script generator 20 has determined that a trace point 44 is required at line #1008 and is identified to be a "for/while" statement. For this type of conditional statement, script generator uses a step option (-step) which requires that all local variables ($local) be collected for a predetermined number of instruction statements (here, 10) following the conditional statement.

Referring to FIG. 4D, line #1011 has been identified by script generator 20 as being a call to a routine and appropriately designates a trace point 46 and instructs source code debugger 16 to collect all local variables. Trace points 48 and 50 are similarly identified as being an "if" statement and "start of execution block" statement, at lines #1013 and #1015, respectively. FIG. 4E shows that script generator 20 has identified an "end of block" statement at line #1028 corresponding to the block, the beginning of which is monitored by trace point 50, and has appropriately designated a trace point 52. A return statement at line #1048 is also recognized by script generator 20 as requiring a trace point 54 for debugging script 22.

Attached as an Appendix is a source code listing for one implementation of a script generator for generating a debugging script written with a C-programming language.

Other embodiments are within the scope of the claims. As discussed above, debugging script 22 provides, without operator intervention, a specification listing of trace points for use by a source code debugger. However, before the debugging script is provided to the source code debugger, the programmer is free to modify the debugging script by providing additional trace points, deleting trace points specified by the script generator, or modifying the variable or function arguments collected at a trace point.

Script generator 20 can also be tailored to perform debugging in special applications. For example, the script generator can be used to evaluate test coverage of source code. That is, the script generator can be used to place trace points at locations to ensure that each and every line is, in fact, executed. For this application, script generator 20 is used to identify and place trace points at every block of execution. A block of execution is defined as a sequence of source level instructions with no flow control therein. In other words, execution of the first instruction of the block requires every other instruction within the same block to be executed. Unlike the approach described above, in conjunction with FIGS. 4A–4E, in this application, there is no requirement for collecting data or storing function arguments or variables. In addition, every time a trace point is executed it can be removed, thereby eliminating any delay caused by instructions executed numerous times.

Additions, subtractions, and other modifications of the disclosed invention will be apparent to those practiced in this art, and are within the scope of the following claims.

What is claimed is:

1. A method of debugging source code having instructions using a source code debugger comprising:

reading each source code instruction;

automatically generating, based on instructions defining execution block or flow control boundaries, a debugging script including a specification of trace points; and providing the debugging script to the source code debugger.

2. The method of claim 1 wherein automatically generating the debugging script includes identifying, using the script generator and based on the type of instruction, a plurality of trace point locations, each trace point including a line identifier and at least one of the function argument or variable to be examined by the source code debugger.

3. The method of claim 2 further comprising:

compiling the source code; and executing the source code in conjunction with the source code debugger.

4. The method of claim 2 further wherein each trace point location in the specification includes a pass-count for determining the number of times the trace point location is executed before terminating execution of a process associated with the source code.

5. The method of claim 2 wherein identifying the plurality of trace point locations is based on a control-flow boundary.

6. The method of claim 5 wherein generating the debugging script includes collecting at least one variable or function argument at the beginning of an execution block.

7. The method of claim 6 wherein the collecting step includes collecting at least one variable or function argument that are changed during execution of the execution of the block.

8. The method of claim 5 wherein the control-flow boundary includes an event selected from the group consisting of instructions:

prior to calling a function, upon returning from a function, upon entering a function, upon exiting a function, at a conditional statement, at the first iteration of a loop, at the completion of a loop, and at an implicit block.

9. The method of claim 1 further comprising manually modifying the debugging script after the generating step and before providing the debugging script to the source code debugger.

10. The method of claim 9 wherein modifying the debugging script includes adding or deleting trace points.

11. The method of claim 9 wherein modifying the debugging script includes changing the variable or function arguments collected at a trace point.

12. A method of determining whether one of a plurality of source code instructions within a source code program has been executed comprising:

providing a script generator which receives the source code instructions;

executing the script generator including:
reading, using the script generator, each source code instruction;
identifying blocks of execution within the source code;
generating a debugging script including a specification of trace points, each trace point placed at the beginning of each block of execution; and
providing the debugging script to the source code debugger.

13. A computer-readable medium storing a computer program which is executable on a computer including a memory, the computer program used with a source code debugger for debugging source code having instructions, the stored program comprising:

a) computer-readable instructions which read each source code instruction;

b) computer-readable instructions which automatically generate, based on instructions defining execution block or flow control boundaries, a debugging script including a specification of trace points; and c) computer-readable instructions which provide the debugging script to the source code debugger.

14. The computer-readable medium of claim 13 further comprising computer-readable instructions which identify the trace points based on the type of source code, each trace point including a line identifier and at least one of the function argument or variable to be examined by the source code debugger.

15. The computer-readable medium of claim 14 further comprising computer-readable instructions which compile the source code and execute the source code in conjunction with the source code debugger.

16. The computer-readable medium of claim 14 wherein each trace point location in the specification includes a pass-count for determining the number of times the trace point location is executed before terminating execution of a process associated with the source code.

17. The computer-readable medium of claim 14 further comprising computer-readable instructions which collect at least one variable or function argument at the beginning of an execution block.

18. The computer-readable medium of claim 17 further comprising computer-readable instructions which collect at least one variable or function argument that are changed during execution of the execution of the block.

* * * * *